July 28, 1942. C. E. CANFIELD 2,291,374
PRESSURE RELIEF DEVICE
Filed May 22, 1940 2 Sheets-Sheet 1
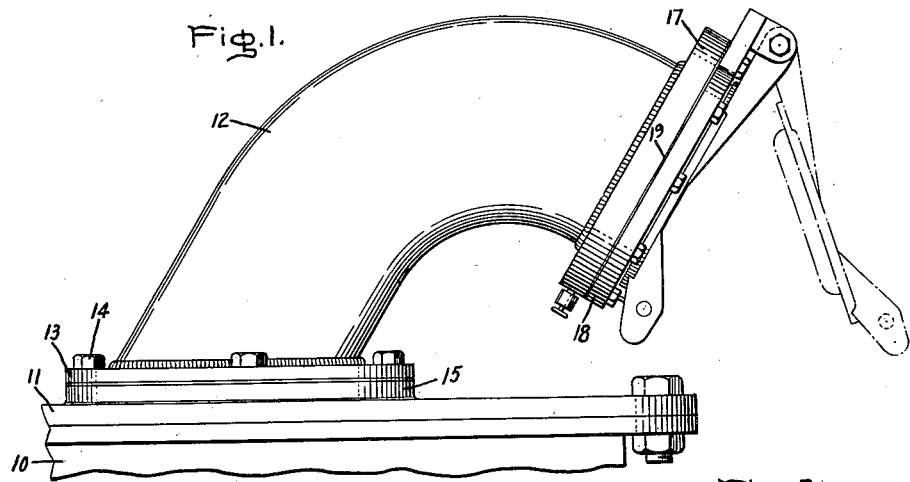
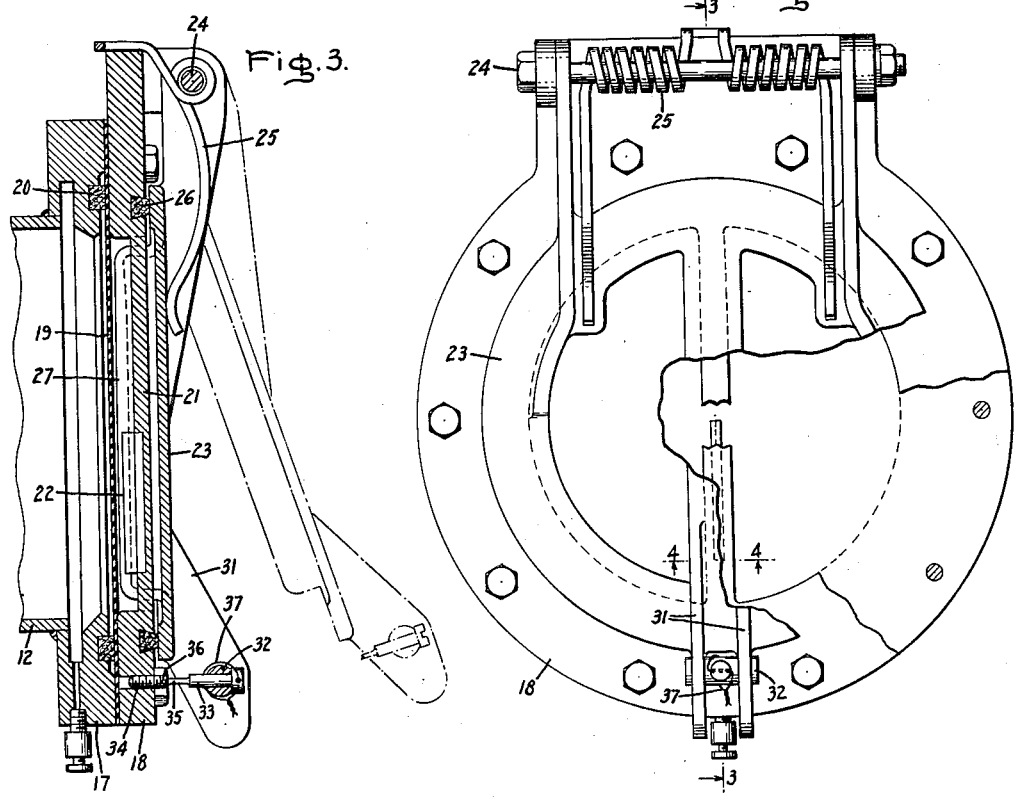
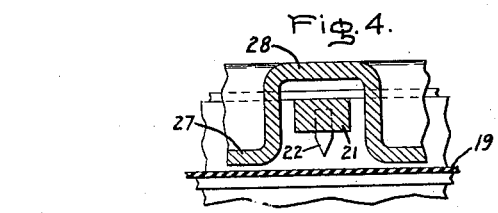
Inventor:
Charles E. Canfield,
by Harry E. Dunbar
Their Attorney.

July 28, 1942.  C. E. CANFIELD  2,291,374
PRESSURE RELIEF DEVICE
Filed May 22, 1940   2 Sheets-Sheet 2
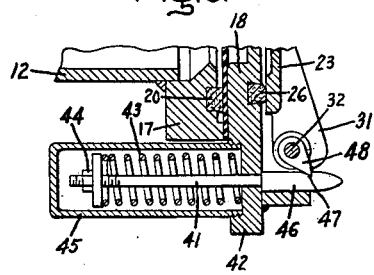
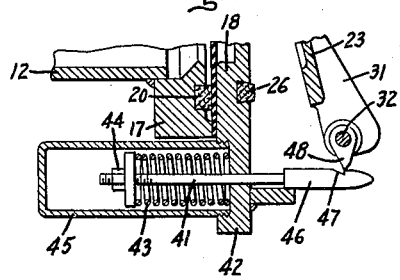
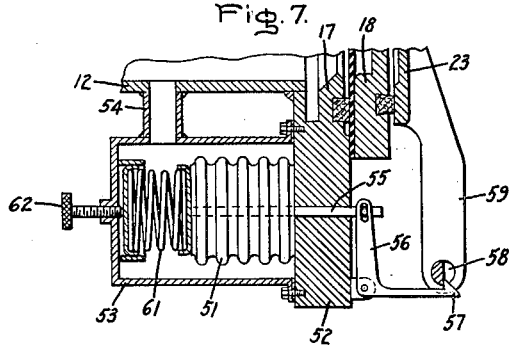
Inventor:
Charles E. Canfield,
by Harry E. Dunham
His Attorney.

Patented July 28, 1942

2,291,374

UNITED STATES PATENT OFFICE 2,291,374

PRESSURE RELIEF DEVICE

Charles E. Canfield, Pittsfield, Mass., assignor to General Electric Company, a corporation of New York Application May 22, 1940, Serial No. 336,574

8 Claims. (Cl. 220—89)

The present invention relates to pressure relief devices and while it is not necessarily limited thereto it is particularly adaptable to casings for electrical apparatus containing an insulating liquid subject to decomposition under abnormal conditions of operation of the electrical apparatus.

Certain forms of electrical apparatus, such as transformers, are enclosed within casings which are more or less filled with an insulating liquid such as oil. Such casings are frequently gas-tight to prevent the entrance of air, moisture or other substnces into the casing which might contaminate the insulating liquid. Upon the occurrence of an abnormal condition of operation of the transformer, such as an arc-over under the oil, large quantities of gases may be suddenly created as a result of the decomposition of the oil and insulation which must be vented from the casing with maximum rapidity to prevent further injury to the apparatus.

It is an object of the present invention to provide a new and improved pressure relief arrangement for an enclosure which is normally gas-tight and which is operable at relatively low pressures to release large quantities of gas to atmosphere with maximum rapidity.

Pressure relief arrangements commonly used heretofore embody a frangible diaphragm secured across an opening in the tank wall and which diaphragm is intended to be ruptured upon the occurrence of a predetermined abnormal condition of pressure within the tank. The pressure within a transformer tank will vary somewhat such as from zero to three pounds per square inch during normal operating conditions, while the rupture pressure for the diaphragm may be of the order of six pounds per square inch. No available diaphragm material was known which would withstand flexing movements during normal operating pressures without being materially weakened over a long period of time so that the ultimate rupture pressure would be much lower than the intended value.

It is a further object, therefore, of this invention to provide a new and improved pressure relief arrangement including a frangible sealing diaphragm in which the rupture strength of the diaphragm will not be impaired by the normal variations of pressure occurring within the enclosure.

For a better understanding of my invention attention is directed to the following description taken in connection with the accompanying drawings in which Fig. 1 is a side elevation of a pressure relief device, constructed in accordance with my invention; Fig. 2 is a plan view thereof partly in section; Fig. 3 is a cross sectional view of Fig. 2 taken along the line 3—3; Fig. 4 is a fragmentary cross sectional view taken along the line 4—4 of Fig. 2, and Figs. 5, 6 and 7 are fragmentary views illustrating further modifications of the invention.

Referring now to the drawings, the invention is illustrated as applied to an enclosure or casing 10 for electrical apparatus such as a transformer (not shown) and which casing is adapted to contain an insulting liquid such as oil. Extending from the cover 11 of the casing is an elbow extension pipe 12 of relatively large diameter, the base flange 13 of which is suitably secured by bolts 14 to an opening flange 15 of the cover. The downwardly sloping end of the pipe 12 is provided with an external flange 17 between which and a clamping ring 18 is secured a sheet 19 of a relatively flexible and frangible material. While any suitable material may be used, I prefer to use a sheet of molded composition commonly known by the trade-marked name of "Herkolite" because of its oil resistant and other desirable characteristics. The sheet or diaphragm 19 is secured over the opening of flange 17 in a gas-tight manner, a suitable gasket 20 being provided in an annular recess of the flange face against which gasket the diaphragm is forced by the clamping ring 18. The opening in the clamping ring is substantially of the same diameter as the opening in the flange 17, so that upon rupture of the diaphragm a maximum passage is provided for the escaping gases. Across the opening of the clamping ring is a diametrically extending bar 21 having a knife-edge 22 embedded therein at one end thereof which is engaged by the diaphragm upon the occurrence of a predetermind pressure within the casing to facilitate the rupture thereof. The particular knife-edge arrangement disclosed is an invention of Mr. Magnus Unger and is more fully described in his copending application Serial No. 336,595 filed May 22, 1940, and assigned to the General Electric Company, the assignee of the present application. The diaphragm 19 is protected from the weather and mechanical injury by a metal cover 23 hinged to the clamping ring 18 as at 24. The cover is normally held relatively firmly by a spring 25 over the diaphragm against a rubber gasket 26 inserted in a cooperative annular recess in the outer face of the clamping ring 18.

In some types of transformers the space above the oil in the casing is filled with an inert gas such as nitrogen, which is maintained at a pressure of the order of three or four pounds per square inch in order to produce a slight outward pressure within the casing to further prevent the leakage of air and moisture through minute unsuspected openings into the casing. In other types of sealed transformers the vapor pressure of the insulating liquid above the surface thereof during normal operation of the transformer may rise and fall with variations in ambient temperature through a range of a few pounds per square inch about atmospheric pressure. Such normal working pressures acting upon a thin unsupported diaphragm might cause a fatigue of the diaphragm material and the ultimate rupture thereof even though a pressure corresponding to the initial rupture strength of the diaphragm is never reached. In the instant arrangement such premature failure of the diaphragm is prevented by a support which limits the outward flexing movement of the diaphragm during normal pressure conditions obtaining within the casing. As shown in drawings, a portion of the cover 23 extending over the opening of the clamping ring is deformed inwardly as at 27 by a distance substantially equal to the thickness of the clamping ring 18 presenting substantially flat surfaces extending parallel with and closely adjacent to the diaphragm, a diametrical recessed portion 28 being provided therein for extending around the bar 21 supporting the knife-edge 22 as is shown more clearly in the fragmentary sketch of Fig. 4. Normal working gas pressures acting upon the diaphragm deflect it slightly so that it rests upon the supporting surface 27 of the cover without severe stresses being imposed upon the diaphragm material. As viewed more clearly in Fig. 4, the diaphragm is supported by the cover portions 27 a safe distance from the knife-edge 22 so that the diaphragm cannot engage with the knife-edge until after the cover is released for outward movement upon a predetermined pressure being exerted thereagainst. Thus the portions 27 are spaced from the diaphragm when it is in a substantially unflexed condition, and the portions engage or support the diaphragm to prevent excessive stressing or outward movement thereof during normal conditions of pressure within the enclosure.

A suitable device is provided for holding the cover 23 firmly in the closed position during normal variations of pressure within the tank, and for automatically releasing the cover for outward movement upon the occurrence of a predetermined abnormal tank pressure. A pair of arms 31 extend from the cover opposite the hinge and are suitably drilled for cooperatively receiving a pin 32. According to one modification of the invention, the cover is normally secured in the closed position by means of a breakable pin 33 extending through a cooperating hole in the pin 32 and threaded as at 34 into the clamping ring 18. The pin 33 may be of any suitable material such as aluminum treated so as to be corrosion resistant and has a section 35 of reduced diameter which may be accurately gauged so that it will break at a predetermined relatively low gas pressure acting upon the cover through the diaphragm such as 10 pounds per square inch. The pin 33 is provided with a small hole 36 extending therethrough just above the threaded portion and through which a small nail or the like may be inserted for screwing the pin into position. It is screwed down only far enough so that the head thereof comes into engagement with the pin 32 on the cover without putting any stress on the pin, particularly at the breakable portion thereof. After the pin 33 is screwed in place it may be sealed by means of a small piece of copper wire 37 inserted through a hole in the head thereof and passed around the pin 32 as indicated.

Upon the occurrence of a predetermined abnormal gas pressure within the transformer casing such as may be caused by an arc under the surface of the insulating liquid, the diaphragm 19 will exert such a pressure upon the cover tensioning the pin 33 and cause it to break. As soon as the relief pin breaks, the cover will fly outwardly against the bias of spring 25 releasing the diaphragm to flex against the knife-edge and be cut thereby. This will be rapidly followed by a complete rupture of the diaphragm and the gases will be freely vented to atmosphere. As soon as the pressure has been relieved, the cover is closed by action of the spring 25 against the rubber gasket 26, thus substantially preventing any rain or snow from entering the casing.

To recondition the pressure relief device the clamping ring 18 may be removed and a new diaphragm substituted for the ruptured one. The threaded portion of the broken relief pin may be unscrewed by a suitable implement inserted into the hole 36 and a new relief pin screwed in place as described above.

According to the modification illustrated in Figs. 5 and 6, a releasable latch mechanism is substituted for the breakable pin to retain the cover in the normally closed position. The latch mechanism includes a plunger 41 extending through a cooperating opening in a portion 42 of the diaphragm clamping ring 18, the plunger being biased to the left by means of a spring 43 arranged therearound between the portion 42 and the adjusting nut 44. The plunger and spring are protected by an enclosing shell 45 threaded into the portion 42. The enlarged right-hand end 46 of the plunger 41 provides a stop therefor and is notched as at 47 for cooperatively receiving the end of a dog 48 pivotally mounted upon the pin 32 extending between the arms 31 of the cover 23.

With normal conditions of pressure obtaining within the transformer tank the cover 23 will be retained by the latch mechanism in a diaphragm supporting position as indicated in Fig. 5. Upon the occurrence of a predetermined abnormal condition of pressure within the tank and acting upon the cover through the diaphragm, the plunger 41 will be forced outwardly or to the right against the bias of spring 43 until the dog 48 pivoting about pin 32 disengages the notch 47. The relative positions of the dog and plunger at the instant of disengagement is illustrated in Fig. 6. The cover is then released for outward movement which, as in the case of the modification described above, is followed by a rupture of the diaphragm and a release of the pressure gases.

In the modification illustrated in Fig. 7, a pressure responsive device is provided for retaining the cover in the normal position but operative upon a predetermined excess pressure condition for releasing the cover for outward movement. In this instance, a collapsible bellows 51 is secured in a gas-tight manner at one end to an extension 52 of the flange ring 17. Surrounding the bellows 51 is a casing 53 which is secured to the extension 52 in a gas-tight manner and the interior of which casing is in communication as through connection 54 with the interior of the vent pipe 12. Arranged axially within the bellows and secured to the left or movable end thereof is an operating stem 55 which extends through a cooperating opening in the extension 52, the outer end of which is suitably connected to one arm of a bellcrank 56. The other arm of the bellcrank is provided with a latch 57 for cooperatively engaging with a flattened portion of a pin 58 secured to and extending between the arms 59 integral with the cover 23. Suitable adjustment for the pressure responsive bellows may be provided by means of a spring 61 arranged between the movable end of the bellows and an adjusting nut 62 suitably threaded into the outer end of the casing 53. Venting of the interior of the bellows may be obtained through the clearance between the stem 55 and the cooperating opening through extension 52.

With normal conditions of pressure obtaining within the transformer tank the bellows 51 is inactive and latch 57 remains in the position shown, retaining the cover 23 in the diaphragm supporting position. Upon the occurrence of a predetermined abnormal condition of pressure within the transformer tank the bellows member 51 will be collapsed, causing the disengagement of the latch 57 thereby releasing the cover 23 for outward movement and permitting the rupture of the diaphragm.

It will be apparent that the pressure relief device described is gas-tight during normal operating conditions of the transformer but a predetermined increase in gas pressure within the enclosure will cause the release of the cover which is rapidly followed by a rupture of the diaphragm to allow the gas to escape at a high rate due to the large size of the opening at the end of the extension pipe 12.

Having described the principle of operation of my invention together with the apparatus which I now consider to represent the best embodiments thereof, I desire to have it understood that the apparatus shown is merely illustrative and that the invention may be carried out by other means.

What I claim as new and desire to secure by Letters Patent of the United States, is:

1. In combination, a casing for electrical apparatus containing an insulating liquid, a vent opening in the upper part of said casing above the liquid level therein having a circumferentially extending flange, a disk diaphragm of flexible, frangible material, said diaphragm being rupturable upon the occurrence of a predetermined abnormal pressure within said casing, a ring for clamping said diaphragm to said flange sealing said opening substantially gas-tight, a cover hinged to said ring and having a portion normally extending parallel with and adjacent to said diaphragm for supporting said diaphragm against excessive outward flexing movement during normal variations in pressure within said casing, latch means for securing said cover in the normal position, said latch means being automatically releasable upon a predetermined pressure being exerted against said cover through said diaphragm so as to permit the rupture of said diaphragm by said abnormal pressure.

2. In combination, a casing for electrical apparatus containing an insulating liquid, a vent opening in said casing, a diaphragm of relatively flexible, frangible material secured over said opening, said diaphragm being rupturable upon the occurrence of a predetermined abnormal pressure within said casing, a cover hinged to said casing adjacent said opening and having a portion with a relatively flat surface which in the normal position of said cover extends parallel to and adjacent the outer surface of said diaphragm for supporting said diaphragm against excessive outward flexing movement during normal variations of pressure within said casing, releasable means for retaining said cover in the normal position, said releasable means being automatically operable to permit an opening movement of said cover upon a predetermined pressure being exerted thereagainst through said diaphragm so as to permit the rupture of said diaphragm by said abnormal pressure.

3. In combination with an enclosure having a vent opening in a wall thereof, a relatively flexible and frangible disk diaphragm, said diaphragm being rupturable upon the occurrence of a predetermined abnormal condition of pressure within said casing, a clamping ring for securing the edge of said diaphragm around said opening, a member for substantially covering the outer surface of said diaphragm, means for pivotally mounting said member on said clamping ring, spring means for biasing said member toward said diaphragm, said member having a portion for normally supporting the outer surface of said diaphragm against excessive outward flexing movement during normal variations of pressure within said enclosure, means for releasably holding said member toward said diaphragm, said means being automatically operable for releasing said member for outward movement so as to remove said supporting portion and allow said diaphragm to rupture upon the occurrence of said predetermined abnormal condition of pressure within said enclosure.

4. A pressure relief arrangement for application to an opening in a wall of an enclosure, said arrangement comprising a relatively flexible and frangible diaphragm, said diaphragm being rupturable upon the occurrence of a predetermined abnormal condition of pressure within said casing, a clamping ring for securing said diaphragm around said opening, a member pivotally mounted upon said ring and having inwardly extending portions presenting substantially flat surfaces extending parallel with and substantially closely adjacent to said diaphragm for normally supporting the outer surface of said diaphragm against excessive outward flexing movement during normal variations of pressure within said enclosure, means for holding said member in said diaphragm supporting position and being adapted to release automatically said member for outward movement so as to remove said supporting portion and allow said diaphragm to rupture upon the occurrence of said predetermined abnormal condition of pressure within said enclosure.

5. In combination with an enclosure having a vent opening in a wall thereof, a relatively frangible diaphragm secured over said opening in a substantially gas-tight relation, said diaphragm being rupturable upon the occurrence of a predetermined abnormal pressure within said enclosure, a member which in the normal position thereof is arranged over the outer surface of said diaphragm, said member having a portion spaced from said diaphragm when it is in unflexed condition and engaging said diaphragm to prevent excessive stressing of said diaphragm during normal conditions of pressure obtaining within said enclosure, means for restraining said member in the normal position, said means being responsive to a predetermined abnormal condition of pressure within said enclosure for automatically releasing said member so as to remove said engaging portion and allow the rupture of said diaphragm by said abnormal pressure.

6. In combination with an enclosure, a vent opening in a wall of said enclosure, a relatively flexible and frangible diaphragm secured gas-tight over said opening, said diaphragm being rupturable upon the occurrence of a predetermined abnormal condition of pressure within said enclosure, a member, means for movably mounting said member, said member having a portion extending substantially parallel to and spaced from said diaphragm when it is in a substantially unflexed condition and normally supporting the outer surface of said diaphragm against excessive outward flexing movement during normal variations of pressure within said enclosure, means for normally holding said member in the diaphragm supporting relation including means for automatically releasing said member for outward movement so as to remove said supporting portion and allow said diaphragm to rupture upon the occurrence of said predetermined abnormal condition of pressure within said enclosure.

7. A pressure relief device for application to a vent opening in a wall of an enclosure, said device comprising a relatively flexible and frangible diaphragm, means for securing said diaphragm substantially gas-tight over said opening, said diaphragm being rupturable upon the occurrence of a predetermined abnormal condition of pressure within said enclosure, a member, means for movably mounting said member, said member normally covering the outer surface of said diaphragm, said member having an inwardly extending portion presenting a substantially flat surface extending parallel with and spaced from said diaphragm with said diaphragm being in a substantially unflexed condition and when said member is in said covering position for supporting a portion of the outer surface of said diaphragm against excessive outward flexing movement during normal variations of pressure within said enclosure, and means for normally retaining said member in said normal position and being automatically operable for releasing said member for outward movement so as to remove said supporting portion and allow said diaphragm to rupture upon the occurrence of said predetermined abnormal condition of pressure within said enclosure.

8. In combination with an enclosure, a vent opening in a wall of said enclosure, a relatively flexible and frangible diaphragm, means for securing said diaphragm substantially gas-tight over said opening, said diaphragm being rupturable upon the occurrence of a predetermined abnormal pressure within said enclosure, a member, means including said diaphragm securing means for pivotally mounting said member, said member having a portion normally extending parallel to and spaced from said diaphragm when it is in a substantially unflexed condition and for normally supporting the outer surface of said diaphragm against excessive outward flexing movement during normal variations of pressure within said enclosure, and automatic means for releasing said member for outward movement so as to remove said supporting portion and allow said diaphragm to rupture upon the occurrence of said predetermined abnormal pressure within said enclosure.

CHARLES E. CANFIELD.